(12) United States Patent
Richter et al.

(10) Patent No.: US 9,139,159 B1
(45) Date of Patent: Sep. 22, 2015

(54) VEHICLE AND A LOCKING ASSEMBLY FOR A SEAT BELT

(71) Applicant: GM GLOBAL TECHNOLOGY OPERATIONS LLC, Detroit, MI (US)

(72) Inventors: Steven J. Richter, Harrison Township, MI (US); George J. Strnad, Rochester, MI (US); Matt R. Gohlke, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/337,517

(22) Filed: Jul. 22, 2014

(51) Int. Cl.
*B60R 22/30* (2006.01)
*B60R 22/00* (2006.01)

(52) U.S. Cl.
CPC ............... *B60R 22/30* (2013.01); *B60R 22/00* (2013.01)

(58) Field of Classification Search
CPC ............................. B60R 22/00; B60R 22/30
See application file for complete search history.

(56) References Cited

U.S. PATENT DOCUMENTS

| | | | | |
|---|---|---|---|---|
| 4,614,007 A * | 9/1986 | Else | ............................ | 24/136 K |
| 5,058,244 A * | 10/1991 | Fernandez | ...................... | 24/170 |
| 5,100,176 A * | 3/1992 | Ball et al. | .................... | 280/801.1 |
| 5,411,292 A | 5/1995 | Collins et al. | | |
| 5,806,148 A * | 9/1998 | McFalls et al. | ................... | 24/168 |
| 5,870,816 A * | 2/1999 | McFalls et al. | ................... | 29/434 |
| 6,708,380 B2 * | 3/2004 | Schneider et al. | ............... | 24/633 |
| 6,832,781 B2 * | 12/2004 | Rastegar et al. | ............... | 280/806 |
| 7,010,836 B2 * | 3/2006 | Acton et al. | ............... | 24/265 BC |
| 7,036,849 B2 * | 5/2006 | Drinkrow | .................... | 280/801.1 |
| 7,325,280 B2 * | 2/2008 | Ichida | .............................. | 24/170 |
| 8,079,616 B2 * | 12/2011 | Higuchi et al. | ................ | 280/806 |
| 8,322,000 B2 * | 12/2012 | Dziengowski et al. | .......... | 24/196 |
| 8,474,106 B2 | 7/2013 | Richter et al. | | |
| 2009/0008919 A1 * | 1/2009 | Mather et al. | .................. | 280/807 |
| 2012/0074253 A1 * | 3/2012 | Dahlquist et al. | ........... | 242/384.7 |
| 2012/0286501 A1 * | 11/2012 | Goudeau et al. | ............ | 280/801.1 |

OTHER PUBLICATIONS

Title: "Free-running cinching latch for seat belts"; Research Disclosure Journal, www.researchdisclosure.com; published in Apr. 2009; pp. 2; Research Disclosure Database No. 540064; Kenneth Mason Publications Ltd.

* cited by examiner

*Primary Examiner* — Paul N Dickson
*Assistant Examiner* — Darlene P Condra
(74) *Attorney, Agent, or Firm* — Quinn Law Group, PLLC

(57) ABSTRACT

A vehicle and a locking assembly for a seat belt are disclosed. A strap is disposed between a locking member and an engagement surface of a support. The strap is spaced from the engagement surface when the locking member is in an initial position. The strap engages the engagement surface when the locking member is in a transitional position to apply a variable load to the strap. The strap engages the engagement surface when the locking member is in a final position to apply a final load to the strap. At least one of the support and the locking member includes a device that restricts rotation of the locking member to limit the final load applied to the strap when the locking member is in the final position such that the strap is movable relative to the locking member when a force applied to the strap exceeds the final load.

20 Claims, 2 Drawing Sheets

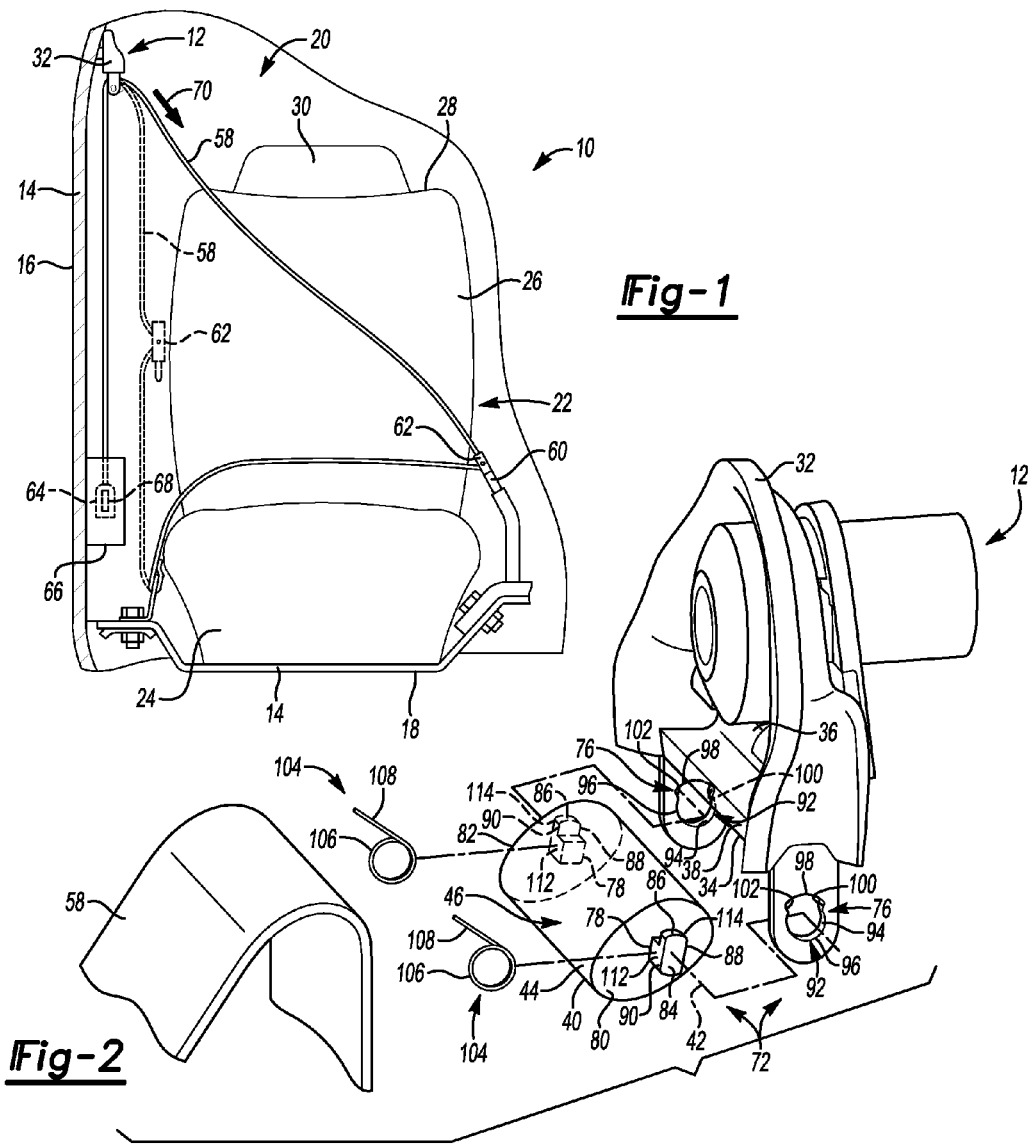
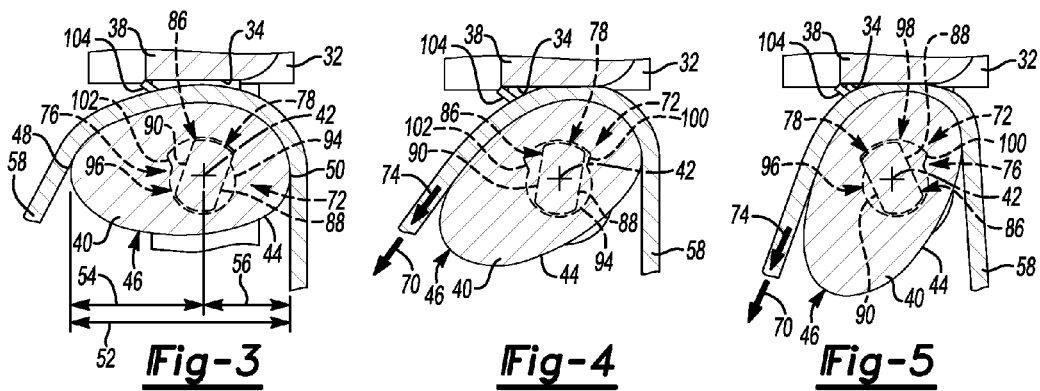

VEHICLE AND A LOCKING ASSEMBLY FOR A SEAT BELT

TECHNICAL FIELD

The present disclosure relates to a vehicle and a locking assembly for a seat belt.

BACKGROUND

Various seat belt designs have been incorporated into various vehicles. Different types of seat belts include harness seat belts, shoulder seat belts and lap belts which are all designed to restrict movement of an occupant of the vehicle in certain situations.

SUMMARY

The present disclosure provides a locking assembly for a seat belt. The locking assembly includes a support and a locking member. The support includes an engagement surface and the locking member is coupled to the support proximal to the engagement surface. The locking member is rotatable between an initial position, a transitional position and a final position. The locking assembly further includes a strap disposed between the locking member and the engagement surface of the support. The strap is spaced from the engagement surface when the locking member is in the initial position. The strap engages the engagement surface when the locking member is in the transitional position to apply a variable load to the strap. The strap engages the engagement surface when the locking member is in the final position to apply a final load to the strap. At least one of the support and the locking member includes a device that restricts rotation of the locking member to limit the final load applied to the strap when the locking member is in the final position such that the strap is movable relative to the locking member when a force applied to the strap exceeds the final load.

The present disclosure also provides a vehicle including a structural frame and a seat. The structural frame includes a side and a base. The seat includes a bottom portion attached to the base of the structural frame and a back portion extending upwardly away from the bottom portion to a seat end. The vehicle also includes a locking assembly. The locking assembly includes a support attached to the side of the structural frame proximal to the seat end of the seat. The support includes an engagement surface. The locking assembly further includes a locking member coupled to the support proximal to the engagement surface. The locking member is rotatable between an initial position, a transitional position and a final position. The locking assembly further includes a strap disposed between the locking member and the engagement surface of the support. The strap is spaced from the engagement surface when the locking member is in the initial position. The strap engages the engagement surface when the locking member is in the transitional position to apply a variable load to the strap. The strap engages the engagement surface when the locking member is in the final position to apply a final load to the strap. At least one of the support and the locking member includes a device that restricts rotation of the locking member to limit the final load applied to the strap when the locking member is in the final position such that the strap is movable relative to the locking member when a force applied to the strap exceeds the final load.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic partial cross-sectional view of a vehicle.

FIG. 2 is a schematic exploded perspective view of a locking assembly of one configuration.

FIG. 3 is a schematic fragmentary cross-sectional view of the locking assembly of FIG. 2 with a locking member in an initial position.

FIG. 4 is a schematic fragmentary cross-sectional view of the locking assembly of FIG. 2 with the locking member in a transitional position.

FIG. 5 is a schematic fragmentary cross-sectional view of the locking assembly of FIG. 2 with the locking member in a final position.

DETAILED DESCRIPTION

Figure 6:
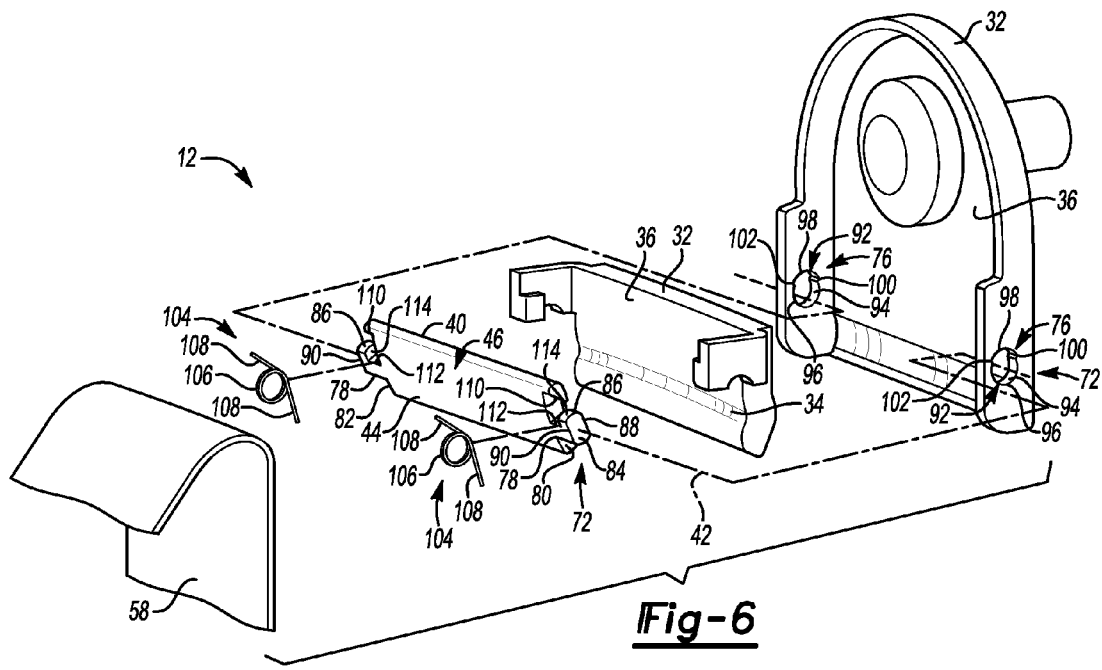
FIG. 6 is a schematic exploded perspective view of a locking assembly of another configuration.

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges that can be subject to human error during installation.

Referring to the Figures, wherein like numerals indicate like or corresponding parts throughout the several views, a vehicle 10 and a locking assembly 12 is generally shown in FIG. 1. The locking assembly 12 can be many different configurations and two suitable examples are shown in the Figures. Specifically, FIGS. 2-5 illustrate one configuration of the locking assembly 12 and FIGS. 6-9 illustrate another configuration of the locking assembly 12.

The locking assembly 12 can be useful for vehicles 10, such as automotive vehicles, cars, trucks, etc. It is to be appreciated that the locking assembly 12 can also be useful for non-automotive applications including, for example, farm, marine, aviation applications, etc.

Referring to FIG. 1, the vehicle 10 can include a structural frame 14. The structural frame 14 can include a side 16 and a base 18. Specifically, the side 16 and the base 18 can cooperate with each other to define a passenger compartment 20. Generally, the side 16 of the structural frame 14 can be proximal to a door and the base 18 of the structural frame 14 can be disposed along a floor of the passenger compartment 20. The structural frame 14 can include another side, and thus, the sides 16 and the base 18 can cooperate to further define the passenger compartment 20. For example, one side of the structural frame 14 can be along a driver's side of the vehicle 10 and another side 16 of the structural frame 14 can be along a passenger's side of the vehicle 10. The side 16 along the passenger's side of the vehicle 10 is shown in FIG. 1 for illustrative purposes only. The structural frame 14 can be any suitable configuration.

Continuing with FIG. 1, the vehicle 10 can also include a seat 22 and an occupant can selectively occupy the seat 22. The seat 22 can include a bottom portion 24 attached to the base 18 of the structural frame 14 and a back portion 26 coupled to the bottom portion 24 and extending upwardly away from the bottom portion 24 to a seat end 28. Therefore, the seat end 28 is spaced from the bottom portion 24. Generally, the seat end 28 can be disposed adjacent to a head rest 30.

The locking assembly 12 is generally for a seat belt. The seat belt can include various components, some of which are discussed below, to selectively restrict movement of the occupant relative to the seat 22.

Referring to FIGS. 2-9, the locking assembly 12 includes a support 32. The support 32 is attached to the side 16 of the structural frame 14 proximal to the seat end 28 of the seat 22 or proximal to the head rest 30. Specifically, the support 32 can be attached or affixed to the structural frame 14 along a B-pillar of the vehicle 10. The support 32 is attached/affixed to the structural frame 14 to withstand various forces which will be discussed further below. The support 32 can be referred to as a D-ring or guide.

Referring to FIGS. 2 and 6, the support 32 includes an engagement surface 34. The engagement surface 34 can be any suitable configuration. For example, the engagement surface 34 can be substantially flat as shown in FIGS. 2-5. As another example, the engagement surface 34 can be arcuate as shown in FIGS. 6-9. Furthermore, the support 32 can be one piece as shown in FIG. 2 or the support 32 can be more than one piece as shown in FIG. 6. When the support 32 includes a plurality of pieces, the pieces are affixed or attached to each other to form a unit that defines the support 32.

The engagement surface 34 can be any suitable location. For example, the support 32 can include a back wall 36 and a side wall 38 adjacent to each other. As shown in FIGS. 2-5, the side wall 38 extends outwardly from the back wall 36, with the engagement surface 34 being part of the side wall 38. As another example, the engagement surface 34 is part of the back wall 36 as shown in FIGS. 6-9.

Figure 7:
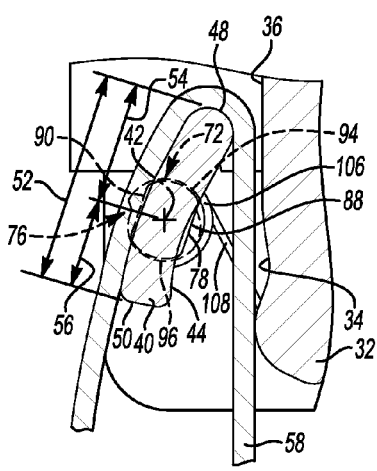
FIG. 7 is a schematic fragmentary cross-sectional view of the locking assembly of FIG. 6 with a locking member in an initial position.
Figure 8:
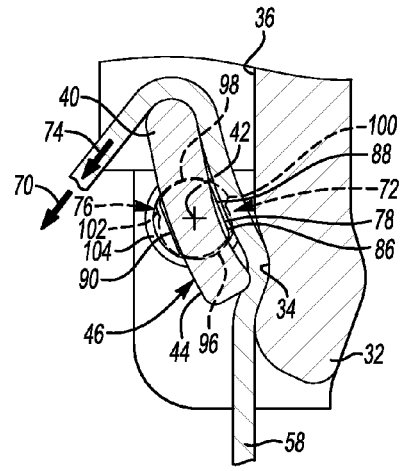
FIG. 8 is a schematic fragmentary cross-sectional view of the locking assembly of FIG. 6 with the locking member in a transitional position.
Figure 9:
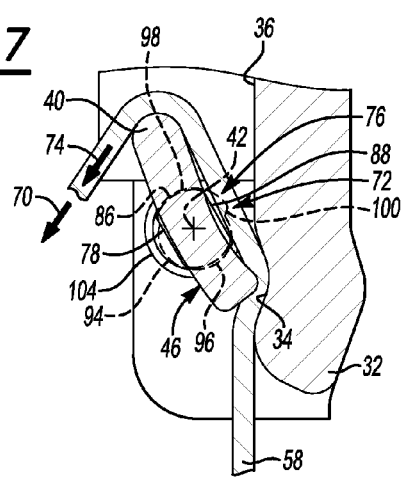
FIG. 9 is a schematic fragmentary cross-sectional view of the locking assembly of FIG. 6 with the locking member in a final position.

Referring to FIGS. 2-9, the locking assembly 12 also includes a locking member 40 coupled to the support 32 proximal to the engagement surface 34. The locking member 40 is rotatable about a pivot axis 42. Specifically, the locking member 40 is rotatable between an initial position, a transitional position and a final position. The initial position is shown in FIGS. 3 and 7. The transitional position is shown in FIGS. 4 and 8. The final position is shown in FIGS. 5 and 9. The support 32 supports the locking member 40 and withstands forces on the strap and the locking member as the locking member 40 rotates to the transitional position and the final position.

The locking member 40 can be any suitable configuration. Specifically, the locking member 40 can include a body 44 having an outer surface 46, with at least a portion of the outer surface 46 being arcuate as shown in FIGS. 2-9. In FIGS. 2-5, the outer surface 46 of the body 44 of the locking member 40 is eccentric. More specifically, the outer surface 46 of the body 44 is arcuate and eccentric relative to the pivot axis 42. In FIGS. 2-5, the body 44 of the locking member 40 can be referred to as a cam.

The pivot axis 42 is off-center relative to the body 44 of the locking member 40 as best shown in FIGS. 3-5 and 7-9. Specifically, the body 44 can include a first end 48 and a second end 50, with the pivot axis 42 disposed between the first end 48 and the second end 50. For the embodiment of FIGS. 6-9, the outer surface 46 of the body 44 at the first end 48 is arcuate, and the second end 50 is at least partially arcuate.

Referring to FIGS. 3 and 7, the body 44 can define a total length 52 between the first end 48 and the second end 50 transverse to the pivot axis 42. The body 44 can define a first length 54 between the first end 48 and the pivot axis 42. Furthermore, the body 44 can define a second length 56 between the second end 50 and the pivot axis 42. The sum of the first length 54 and the second length 56 equals the total length 52. The first length 54 is greater than the second length 56 which further defines that the pivot axis 42 is off-center through the body 44 of the locking member 40. Simply stated, the different lengths 54, 56 between the pivot axis 42 and the ends 48, 50 cause the body 44 to be unbalanced to assist in rotating the locking member 40 about the pivot axis 42.

Referring to FIG. 1, the locking assembly 12 further includes a strap 58 or belt. The strap 58 can be selectively disposed across the occupant inside the passenger compartment 20. The strap 58 can be formed of a plurality of strands weaved or braided together. The strap 58 can also be referred to as webbing. The strap 58 is flexible to allow the strap 58 to contour around the occupant when seated in the seat 22 and move out of the way of the occupant when the occupant is entering or exiting the passenger compartment 20. The strap 58 is also flexible to contour around or lay over a portion of the locking member 40. For example, the strap 58 can lay flush over a portion of the locking member 40. The strap 58 can be any suitable configuration that has flexible properties.

Continuing with FIG. 1, the vehicle 10 can also include a buckle 60 coupled to the base 18 of the structural frame 14 and disposed proximal to the bottom portion 24 of the seat 22. The vehicle 10 can further include a latch 62 coupled to the strap 58, with the latch 62 selectively engaging the buckle 60. The latch 62 is movable along the strap 58 to, for example, accommodate different sized occupants. When the latch 62 engages the buckle 60, the strap 58 is disposed across the seat 22 as shown in the solid lines of FIG. 1. When the latch 62 is engaged with the buckle 60, a portion of the strap 58 is disposed across the back portion 26 of the seat 22 and another portion of the strap 58 is disposed across the bottom portion 24. Therefore, the seat belt has a shoulder restraint and a lap restraint.

When the latch 62 is disengaged from the buckle 60, the strap 58 is disposed proximal to the side 16 of the structural frame 14 as shown in the phantom lines of FIG. 1. In other words, when the latch 62 is disengaged from the buckle 60, the strap 58 is not disposed across the seat 22. When the latch 62 is disengaged from buckle 60, the occupant can move into or out of the seat 22 without restraint.

Referring to FIG. 1, the vehicle 10 can include a retractor 64 which can spool any excess strap 58. In other words, a portion of the strap 58 can be wrapped around a spool or shaft. Depending on the size of the occupant, the refractor 64 can spool out more strap 58 or retract in any excess strap 58. The retractor 64 can be disposed in a housing 66 or cover. The retractor 64 can be in any suitable location, and FIG. 1 illustrates one suitable location proximal to the bottom portion 24 of the seat 22.

Optionally, the vehicle 10 can include a pretensioner device 68 or a twist shaft (see FIG. 1) coupled to the refractor 64. The pretensioner device 68 can be disposed in the housing 66. The pretensioner device 68 can be activated when a predetermined event occurs. When utilizing the pretensioner device 68, this device 68 is activated automatically when the predetermined event occurs. When the pretensioner device 68 is activated, this device 68 causes the strap 58 about the retractor 64 to be spooled tighter on the retractor 64 which limits movement of the strap 58 out of the retractor 64. The pretensioner device 68 is operated when the predetermined event occurs while the retractor 64 operates when the occupant is moving the strap 58 to fasten the latch 62 with the buckle 60 to dispose the strap 58 across the occupant or unfasten the latch 62 with the buckle 60 to retract the strap 58 out of the way.

Referring to FIGS. 3 and 7, the strap 58 is disposed between the locking member 40 and the engagement surface 34 of the support 32. Furthermore, the strap 58 is wrapped over a portion of the body 44 of the locking member 40. Therefore, the strap 58 is fed through the locking assembly 12. The strap 58 extends from the retractor 64, over the body 44 of the locking member 40 between the locking member 40 and the engagement surface 34, and to the strap 58 that extends through the latch 62. Due to the location of the pivot axis 42 and configuration of the body 44 of the locking member 40, when a threshold load is applied to the strap 58 in a predetermined direction 70 (see arrow 70), the locking member 40 rotates about the pivot axis 42.

The strap 58 is spaced from the engagement surface 34 when the locking member 40 is in the initial position (see FIGS. 3 and 7). The strap 58 engages the engagement surface 34 when the locking member 40 is in the transitional position to apply a variable load to the strap 58 (see FIGS. 4 and 8). The strap 58 engages the engagement surface 34 when the locking member 40 is in the final position to apply a final load to the strap 58 (see FIGS. 5 and 9). When the variable load or the final load is applied to the strap 58, the strap 58 is pinched or squeezed between the body 44 of the locking member 40 and the engagement surface 34. The variable load can increase as the locking member 40 continues to rotate from the initial position toward the final position, which further pinches the strap 58. The variable load and the final load can be any suitable values depending on the desired parameters.

Referring to FIGS. 2 and 6, at least one of the support 32 and the locking member 40 includes a device 72 that restricts rotation of the locking member 40 to limit the final load applied to the strap 58 when the locking member 40 is in the final position such that the strap 58 is movable relative to the locking member 40 when a force 74 (see arrow 74) applied to the strap 58 exceeds the final load. Specifically, when the predetermined event occurs, the force 74 is applied to the strap 58 in the predetermined direction 70 which causes the locking member 40 to rotate about the pivot axis 42. The strap 58 can move as the locking member 40 is rotated which allows the strap 58 to absorb energy as the strap 58 moves, which will be discussed further below. The predetermined direction 70 can be angularly outwardly away from the support 32. Generally, the predetermined direction 70 is along the strap 58 outwardly toward the buckle 60. Therefore, in certain situations, the strap 58 can be fed or paid out along the predetermined direction 70.

The phrase "at least one of" as used herein should be construed to include the non-exclusive logical "or", i.e., at least one of the support 32 or the locking member 40. Therefore, in certain embodiments, the support 32 can include the device 72 or the locking member 40 can include the device 72. In other embodiments, the support 32 and the locking member 40 can include the device 72.

The strap 58 engages the engagement surface 34 of the support 32 as the locking member 40 is rotated from the initial position to the transitional position and the final position. Generally, the strap 58 is pinched or squeezed between the locking member 40 and the engagement surface 34 when in the transitional position and the final position. Therefore, the strap 58 can move freely over the locking member 40 when the locking member 40 is in the initial position. The strap 58 is pinched when the threshold load is applied to the strap 58, which causes the locking member 40 to rotate to the transitional position or the final position. The locking member 40 can be in many different positions when in the transitional position. The transitional position is any position pinching the strap 58 between the initial position and the final position. Said differently, the transitional position is any position except for the initial position and the final position.

The force 74 applied to the strap 58 does not always exceed the final load. When the force 74 applied to the strap 58 does not exceed the final load, engagement of the strap 58 between the locking member 40 and the engagement surface 34 prevents the strap 58 from moving, i.e., being fed or paid out, in the predetermined direction 70. In certain situations, the force 74 applied to the strap 58 causes the locking member 40 to rotate to the transitional position instead of the final position. In other situations, the force 74 applied to the strap 58 causes the locking member 40 to rotate to the final position without exceeding the final load.

The force 74 applied to the strap 58 can be any suitable values depending on the desired parameters. For example, the force 74 applied to the strap 58 can exceed the final load when about 2.5 kilo-newton (kN) to about 5.0 kN is applied to the strap 58. Therefore, as a specific example, when 2.5 kN exceeds the final load and the force 74 applied to the strap 58 is greater than zero and less than 2.5 kN, the locking member 40 rotates to the transitional position to apply the transitional load that pinches the strap 58. As another specific example, when 5.0 kN exceeds the final load and the force 74 applied to the strap 58 is greater than zero and less than 5.0 kN, the locking member 40 rotates to the transitional position to apply the transitional load that pinches the strap 58.

In certain embodiments, when the locking member 40 is in the final position, and thus the strap 58 is pinched at the final load, the thickness of the strap 58 (where pinched) can be reduced by about 40.0 percent (%) to about 60.0%. In other embodiments, when the locking member 40 is in the final position, and thus the strap 58 is pinched at the final load, the thickness of the strap 58 (where pinched) can be reduced by about 50.0%. In one embodiment, when the locking member 40 is in the final position and thus the strap 58 is pinched at the final load, the thickness of the strap 58 (where pinched) can be reduced by about 58.0%.

The location of the locking assembly 12 allows the timing to restrict movement of the strap 58 to be changed. Specifically, by having the locking member 40 disposed proximal to the head rest 30 of the seat 22 along the B-pillar, the timing of when the locking member 40 restricts movement of the strap 58 can be sooner than when the pretensioner device 68 can restrict movement of the strap 58 proximal to the head rest 30. For example, about 10.0 millimeters (mm) to about 30.0 mm of the strap 58 can pass between the locking member 40 and the engagement surface 34 before the force 74 exceeds the final load, which passes through less strap 58 than if there was no locking assembly 12 located proximal to the head rest 30. As one specific example, when the predetermined event occurs, the force 74 increases from zero to about 3.0 kN, and in this example, the 3.0 kN exceeds the final load; and therefore, about 30.0 mm of strap 58 passes between the engagement surface 34 and the locking member 40 as the force 74 increases to about 3.0 kN. Continuing with this specific example, the strap 58 will continue to move or payout along the predetermined direction 70 if the force 74 applied to the strap 58 continues to be about 3.0 kN. The force 74 applied to the strap 58 verses the payout of the strap 58 can be a generally linear relationship (i.e., can have slight variances, etc.) until the force 74 exceeds the final load. Once the force 74 exceeds the final load, the final load applied to the strap 58 remains substantially the same while the strap 58 can continue to move or payout along the predetermined direction 70. The strap 58 absorbs energy as the strap 58 continues to payout along the predetermined direction 70. Therefore, the locking assembly 12 is configured to limit the load that pinches the strap 58 to allow the strap 58 to continue to payout and thus absorb energy.

Referring to FIGS. 2 and 6, the device 72 can include an abutment 76 disposed on one of the support 32 and the locking member 40. Furthermore, the device 72 can include an arm 78 extending from the other one of the support 32 and the locking member 40. The arm 78 is rotatable to selectively engage the abutment 76. Engagement between the arm 78 and the abutment 76 restricts movement of the arm 78, and more specifically, restricts rotation of the arm 78 about the pivot axis 42. In certain embodiments, as best shown in FIGS. 2 and 6, the abutment 76 is disposed on the support 32 and the arm 78 extends from the locking member 40. In other embodiments, the abutment 76 is disposed on the locking member 40 and the arm 78 extends from the support 32. The abutment 76 and the arm 78 can be any suitable configuration and examples are discussed below.

Referring to FIGS. 2 and 6, the body 44 of the locking member 40 can include a first side 80 and a second side 82 spaced from each other. Generally, the first side 80 and the second side 82 are spaced from each other along the pivot axis 42. The arm 78 can extend from one of the first side 80 and the second side 82 and the arm 78 can extend from one of the first side 80 and the second side 82 to a distal end 84.

Continuing with FIGS. 2 and 6, the arm 78 can include a periphery 86 selectively engaging the abutment 76. More specifically, the periphery 86 can include a first edge 88 and a second edge 90 spaced from and opposing the first edge 88. The first edge 88 and the second edge 90 can be any suitable configuration to selectively engage the abutment 76 as discussed further below.

Again continuing with FIGS. 2 and 6, the support 32 can define an aperture 92 and has an inner wall 94 disposed adjacent to the aperture 92. Specifically, the inner wall 94 faces the aperture 92. Generally, a portion of the inner wall 94 presents the abutment 76. At least a portion of the periphery 86 is disposed in the aperture 92 such that the inner wall 94 encircles a portion of the arm 78. Specifically, at least a portion of the first edge 88 and the second edge 90 are disposed in the aperture 92.

Referring to FIGS. 2 and 6, the inner wall 94 can include a first segment 96 presenting a substantially circular configuration and a second segment 98 including the abutment 76. The first segment 96 and the second segment 98 are adjacent to each other and cooperate with each other to surround the aperture 92. The abutment 76 starts generally where the first segment 96 and the second segment 98 meet. Generally, at least a portion of the arm 78 is disposed in the first segment 96 and the second segment 98. Specifically, the periphery 86, and more specifically, the first edge 88 and the second edge 90, are each disposed in the first segment 96 and the second segment 98.

As shown in FIGS. 2 and 6, the abutment 76 can include a first stop surface 100 and a second stop surface 102 spaced from each other. The periphery 86 engages the first stop surface 100 when in the initial position (see FIGS. 3 and 7) and engages the second stop surface 102 when in the final position (see FIGS. 5 and 9). More specifically, the first edge 88 engages the first stop surface 100 when in the initial position and the second edge 90 engages the second stop surface 102 when in the final position. The periphery 86 is spaced from the first stop surface 100 and the second stop surface 102 when in the transitional position (see FIGS. 4 and 8). More specifically, the first edge 88 and the second edge 90 are spaced from the first stop surface 100 and the second stop surface 102 when in the transitional position. The first stop surface 100 and the second stop surface 102 limit the amount of rotation of the locking member 40. Therefore, when the strap 58 is pinched at the final load, the load that pinches the strap 58 cannot be increased due to the second edge 90 engaging the second stop surface 102, which prevents further rotation of the locking member 40. As such, limiting the rotation of the locking member 40, which thus, limits the final load, the strap 58 can continue to move or payout along the predetermined direction 70 when the force 74 exceeds the final load.

Referring to FIGS. 2 and 6, the locking assembly 12 can further include a biasing member 104 coupled to the arm 78 of the locking member 40 and engaging the support 32 to continuously bias the locking member 40 to the initial position. The biasing member 104 can be a spring as shown in FIGS. 2 and 6, a coil spring, or any other suitable biasing member. It is to be appreciated that more than one biasing member 104 can be coupled to one arm 78.

The biasing member 104 of FIGS. 2 and 6 each can include a ring part 106 disposed about the arm 78 and at least one finger 108 extending outwardly from the ring part 106. Difference configurations of the biasing member 104 are shown in FIGS. 2 and 6. In the FIG. 2 embodiment, the biasing member 104 has a single finger 108 and in the FIG. 6 embodiment, the biasing member 104 has a plurality of fingers 108.

The single finger 108 of FIG. 2 engages the support 32 to continuously bias the locking member 40 to the initial position. The ring part 106 of FIG. 2 engages a portion of the arm 78 such that the biasing member 104 causes the locking member 40 to continuously bias to the initial position. The single finger 108 can engage the support 32 in any suitable location, and one suitable example is engaging the support 32 adjacent to the engagement surface 34.

For the FIG. 6 embodiment, one of the fingers 108 engage a shoulder 110 of the locking member 40 and another one of the fingers 108 engage the support 32 which causes the biasing member 104 to continuously bias the locking member 40 to the initial position. The finger 108 that engages the support 32 in FIG. 6, can engage the support 32 in any suitable location, and one suitable example is engaging the support 32 adjacent to the engagement surface 34. The shoulder 110 can be spaced from the arm 78 and in certain embodiments, extends from one of the first side 80 and the second side 82 of the body 44. The shoulder 110 and the arm 78 can extend from the same side 80, 82 in a spaced relationship.

Referring to FIGS. 2 and 6, the arm 78 can include a stem 112 extending outwardly from the locking member 40 to the distal end 84. Generally, the biasing member 104 is disposed about the stem 112. More specifically, the ring part 106 of the biasing member 104 is disposed about the stem 112.

Continuing with FIGS. 2 and 6, the arm 78 can further include a projection 114 extending outwardly from the distal end 84. The projection 114 can be disposed in the aperture 92 such that the projection 114 selectively engages the abutment 76. Furthermore, the projection 114 can include the first edge 88 and the second edge 90.

The above discussion refers to the device 72 including one abutment 76 and one arm 78. However, the device 72 can have more than one abutment 76 and one arm 78. Specifically, in certain embodiments, the device 72 can include a plurality of abutments 76 extending from one of the support 32 and the locking member 40 and the device 72 includes a plurality of arms 78 extending from the other one of the support 32 and the locking member 40. The arms 78 are rotatable to selectively engage respective abutments 76. Furthermore, in certain embodiments, one arm 78 can extend from the locking member 40 and another arm 78 can extend from the support 32. As such, one abutment 76 can extend from the support 32 to cooperate with the arm 78 of the locking member 40 and another abutment 76 can extend from the locking member 40 to cooperate with the arm 78 of the support 32. The features of the abutments 76 and the arms 78 are the same as discussed above for one arm 78 and one abutment 76, and therefore will not be re-discussed.

The locking assembly 12 described herein begins to restrict movement of the strap 58 at the seat end 28 of the seat 22, instead of beginning to restrict movement of the strap 58 at the retractor 64, thus the timing to restrict movement of the strap 58 can be changed. Specifically, the locking assembly 12 is disposed proximal to the seat end 28, instead of proximal to the retractor 64, to decrease the time that the movement of the strap 58 is restricted. Therefore, the location of the locking assembly 12 allows the strap 58 to begin to absorb energy sooner. The locking assembly 12 described herein can absorb energy during the predetermined event. The strap 58 is movable relative to the locking member 40 when the force 74 applied to the strap 58 exceeds the final load which allows energy to be absorbed through the strap 58. Having energy absorbed through the strap 58 reduces the energy transferred to a mass being restrained by the strap 58. This locking assembly 12 can be utilized without the pretensioner device 68 discussed above. Eliminating the pretensioner device 68 can reduce manufacturing costs, mass of the vehicle 10, as well as eliminate electrical connection warranty of the seat belt.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A locking assembly for a seat belt; the assembly comprising:
    a support including an engagement surface;
    a locking member coupled to the support proximal to the engagement surface, with the locking member rotatable between an initial position, a transitional position and a final position;
    a strap disposed between the locking member and the engagement surface of the support, wherein the strap is spaced from the engagement surface when the locking member is in the initial position, wherein the strap engages the engagement surface when the locking member is in the transitional position to apply a variable load to the strap, and wherein the strap engages the engagement surface when the locking member is in the final position to apply a final load to the strap; and
    wherein at least one of the support and the locking member includes a device that restricts rotation of the locking member to limit the final load applied to the strap when the locking member is in the final position such that the strap is movable relative to the locking member when a force applied to the strap exceeds the final load.

2. An assembly as set forth in claim 1 wherein the device includes an abutment disposed on one of the support and the locking member and the device includes an arm extending from the other one of the support and the locking member, with the arm being rotatable to selectively engage the abutment.

3. An assembly as set forth in claim 2 wherein the abutment is disposed on the support and the arm extends from the locking member.

4. An assembly as set forth in claim 2 wherein the arm includes a periphery selectively engaging the abutment.

5. An assembly as set forth in claim 4 wherein the support defines an aperture and has an inner wall disposed adjacent to the aperture, with a portion of the inner wall presenting the abutment, and wherein at least a portion of the periphery is disposed in the aperture such that the inner wall encircles a portion of the arm.

6. An assembly as set forth in claim 5 wherein the inner wall includes a first segment presenting a substantially circular configuration and a second segment including the abutment.

7. An assembly as set forth in claim 4 wherein the abutment includes a first stop surface and a second stop surface spaced from each other, with the periphery engaging the first stop surface when in the initial position and engaging the second stop surface when in the final position, and with the periphery spaced from the first stop surface and the second stop surface when in the transitional position.

8. An assembly as set forth in claim 7 wherein the periphery includes a first edge and a second edge spaced from and opposing the first edge, with the first edge engaging the first stop surface when in the initial position and the second edge engaging the second stop surface when in the final position.

9. An assembly as set forth in claim 2 further including a biasing member coupled to the arm of the locking member and engaging the support to continuously bias the locking member to the initial position.

10. An assembly as set forth in claim 9 wherein the arm includes a stem extending outwardly from the locking member to a distal end, wherein the arm includes a projection extending outwardly from the distal end, wherein the biasing member is disposed about the stem.

11. An assembly as set forth in claim 10 wherein the support defines an aperture and has an inner wall disposed adjacent to the aperture, with a portion of the inner wall presenting the abutment, and wherein the projection is disposed in the aperture such that the projection selectively engages the abutment.

12. An assembly as set forth in claim 2 wherein the locking member includes a body having an outer surface, with at least a portion of the outer surface being arcuate, and wherein the body includes a first side and a second side spaced from each other, with the arm extending from one of the first side and the second side.

13. An assembly as set forth in claim 1 wherein the locking member includes a body having an outer surface being eccentric.

14. An assembly as set forth in claim 1 wherein the engagement surface is substantially flat.

15. An assembly as set forth in claim 1 wherein the engagement surface is arcuate.

16. An assembly as set forth in claim 1 wherein the device includes a plurality of abutments disposed on one of the support and the locking member and the device includes a plurality of arms extending from the other one of the support and the locking member, with the arms being rotatable to selectively engage respective abutments.

17. A vehicle comprising:
  a structural frame including a side and a base;
  a seat including a bottom portion attached to the base of the structural frame and a back portion extending upwardly away from the bottom portion to a seat end;
  a locking assembly comprising:
    a support attached to the side of the structural frame proximal to the seat end of the seat, with the support including an engagement surface;
    a locking member coupled to the support proximal to the engagement surface, with the locking member rotatable between an initial position, a transitional position and a final position;
    a strap disposed between the locking member and the engagement surface of the support, wherein the strap is spaced from the engagement surface when the locking member is in the initial position, wherein the strap engages the engagement surface when the locking member is in the transitional position to apply a variable load to the strap, and wherein the strap engages the engagement surface when the locking member is in the final position to apply a final load to the strap; and
    wherein at least one of the support and the locking member includes a device that restricts rotation of the locking member to limit the final load applied to the strap when the locking member is in the final position such that the strap is movable relative to the locking member when a force applied to the strap exceeds the final load.

18. A vehicle as set forth in claim 17 further including a buckle coupled to the base of the structural frame and disposed proximal to the bottom portion of the seat, and further including a latch coupled to the strap and selectively engaging the buckle, with the latch movable along the strap.

19. A vehicle as set forth in claim 18 wherein the device includes an abutment disposed on the support and the device includes an arm extending from the locking member, with the arm being rotatable to selectively engage the abutment.

20. A vehicle as set forth in claim 19 wherein the arm includes a periphery selectively engaging the abutment and wherein the abutment includes a first stop surface and a second stop surface spaced from each other, with the periphery engaging the first stop surface when in the initial position and engaging the second stop surface when in the final position, and with the periphery spaced from the first stop surface and the second stop surface when in the transitional position.

* * * * *